Dec. 27, 1966    D. BARNARD    3,293,743
MACHINE FOR WELDING ARTICLES OF MANUFACTURE
Filed Jan. 22, 1965    3 Sheets-Sheet 1

INVENTOR
DALE BARNARD
BY
*Charles L. Lovercheck*
*attorney*

Dec. 27, 1966      D. BARNARD      3,293,743

MACHINE FOR WELDING ARTICLES OF MANUFACTURE

Filed Jan. 22, 1965      3 Sheets-Sheet 2

INVENTOR.
DALE BARNARD
BY
Charles L. Lovercheck
attorney

Dec. 27, 1966     D. BARNARD     3,293,743

MACHINE FOR WELDING ARTICLES OF MANUFACTURE

Filed Jan. 22, 1965     3 Sheets-Sheet 3

INVENTOR
DALE BARNARD
BY
*Charles L. Lovercheck*
attorney

United States Patent Office 3,293,743
Patented Dec. 27, 1966

3,293,743
MACHINE FOR WELDING ARTICLES OF MANUFACTURE
Dale Barnard, Cochranton, Pa., assignor to Glass-Tite Industries, Inc., Providence, R.I., a corporation of Rhode Island
Filed Jan. 22, 1965, Ser. No. 427,447
7 Claims. (Cl. 29—563)

This invention relates to assembly machines and, more particularly, to machines for welding small parts together.

In the manufacture of certain modern electronic components, it is necessary to weld a very small length of ribbon to a very small disk. The ribbon may be in the form of wire which is sometimes made of nickel cobalt iron alloy, plated with gold. The disk itself may also be plated with gold and, therefore, the parts themselves are quite expensive and it is important that a minimum of scrap results from the operation.

It has been discovered that by cutting the disks out of a continuous sheet of ribbon after the small piece of ribbon has been welded to them and formed to the desired shape, the entire process can be carried out more accurately, efficiently and effectively.

In the process according to the invention, a flat ribbon of material from which the disks are to be cut is passed adjacent a roll of the material that is to be welded to it. The end of the ribbon is then welded to the strip of material and, at the same time, a pilot hole is pressed into the strip of material to positively locate the welded piece of subsequent operation and the end of the material that is welded to the strip is severed from the roll.

The strip of material having the pieces of ribbon welded to it is then moved to a forming die where the ribbon is formed to the desired shape. The strip is then passed to a blanking die which presses or cuts out the disks having the parts attached thereto.

It is, accordingly, an object of the present invention to provide an improved assembly machine.

Another object of the invention is to provide a machine for welding very small parts together.

A further object of the invention is to provide a machine for the purpose indicated which is simple in construction, economical to manufacture, and simple and efficient to use for the purposes aforesaid.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
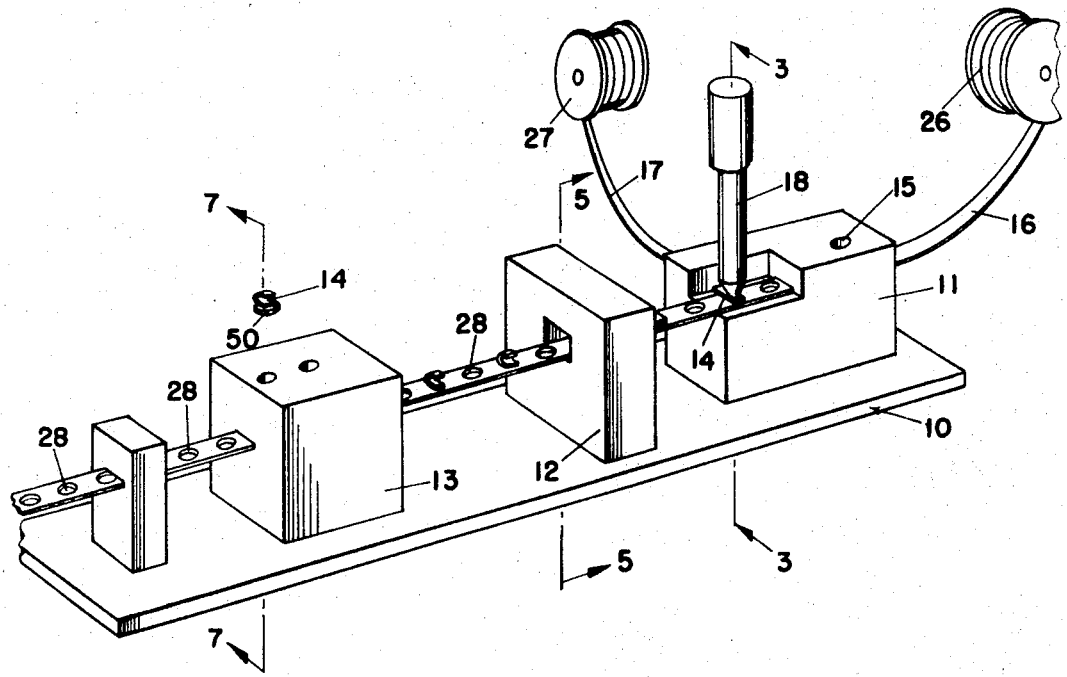
FIG. 1 is an isometric schematic view of a machine according to the invention.
Figure 2:
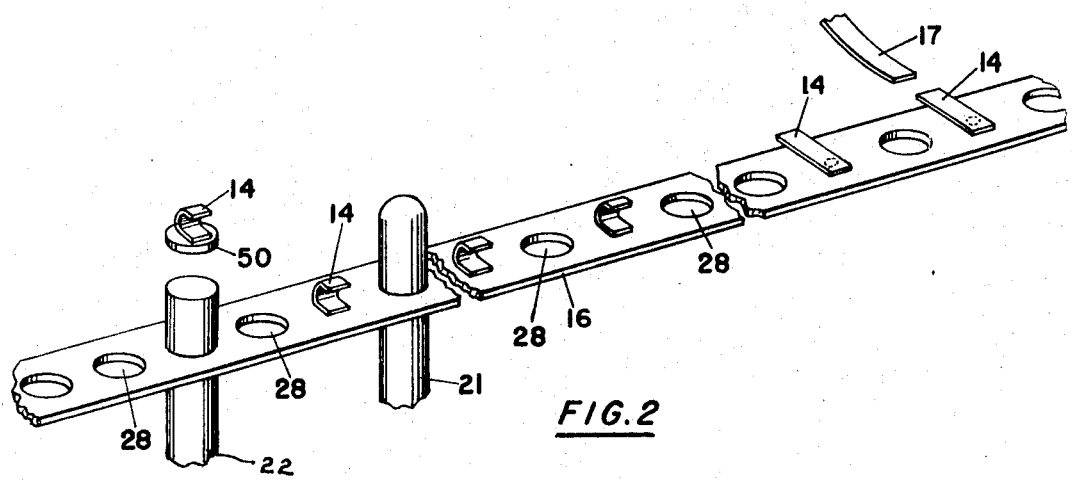
FIG. 2 is a view illustrating the several steps of the process.
Figure 3:
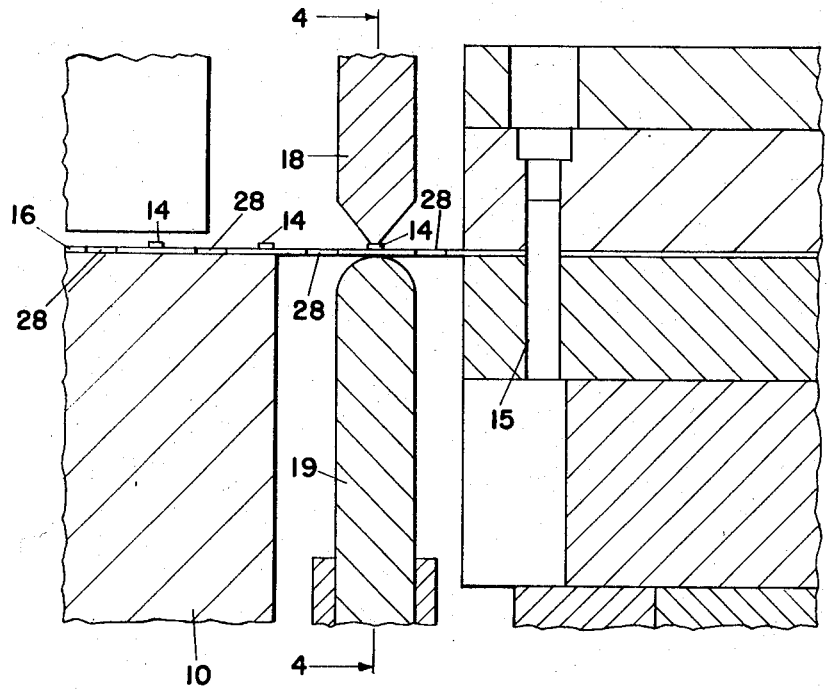
FIG. 3 is an enlarged cross sectional view of the welding and pilot hole blanking device taken on line 3—3 of FIG. 1.
Figure 4:
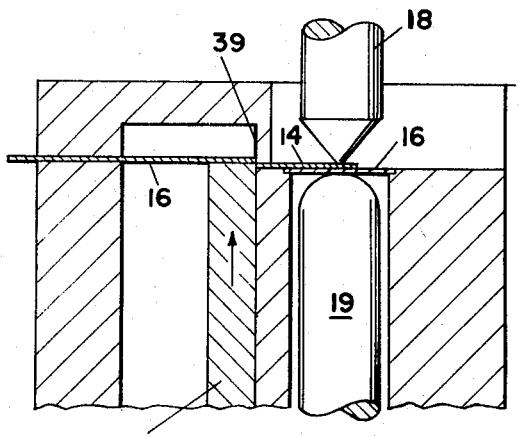
FIG. 4 is an enlarged cross sectional view of the ribbon severing device.

Now with more particular reference to the drawings, the machine shown in the several figures of drawings is generally indicated at 10. It is made up of the welding station 11, a forming station 12, and a punching station 13.

The strip 16 is supplied from a reel 26 and may be indexed past the several stations by a suitable indexing mechanism. A ribbon 17 is supplied from a reel 27 and is indexed forward an equal amount to the piece of material 14 each time the strip 16 is indexed. The ribbon 17 is guided to precisely locate it relative to the pilot punch 15 and each time the ribbon 17 and strip 16 are indexed forward, the welding electrode 18 will descend and weld the end of a piece of material 14 of the ribbon 17 to the strip 16. Simultaneously, the pilot punch 15 will blank a pilot hole 28 in the strip. The pilot punch 15 and the back-up 19 are synchronized so that they move forward together so that the pilot holes 28 are punched in the strip a precise distance from the ribbons.

As soon as the welding electrode 18 engages the end of the piece of material 14, the severing member 37 is driven upward and it moves along shearing surface 39 and shears off the end from the material 14.

Figure 5:
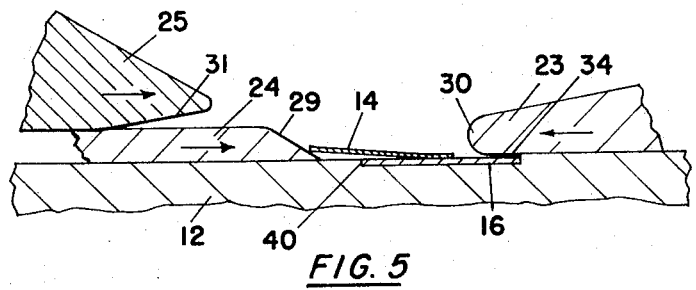
FIG. 5 is an enlarged cross sectional view of the shaping device taken on line 5—5 of FIG. 1.
Figure 6:
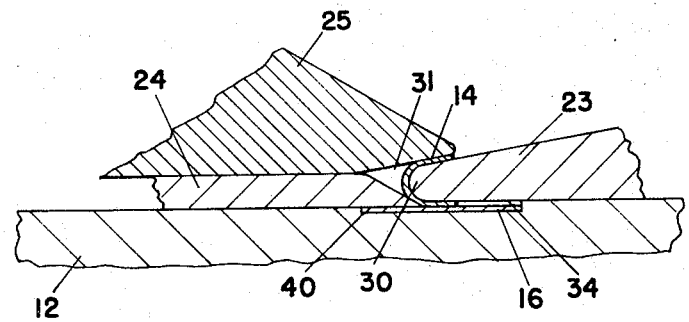
FIG. 6 is a cross sectional view of the device shown in FIG. 5 showing the parts thereof moved to form a bend.

After material 14 is welded to the strip, the strip 16 is advanced or indexed to the forming station 12. The forming station 12 is shown in particular detail in FIGS. 5 and 6. It is made up of a wedge shaped deflecting member which has an upwardly and outwardly inclined surface 29 which moves under the material 14 and bends it upward. It will be noted that the strip 16 is recessed into the top surface of the forming member 12 at 40 so that the bottom surface of the wedge shaped forming member 24 is slightly above the top surface of the strip 16. This makes it possible for a sharp bend to be formed in the end.

The back-up forming punch 23 is shaped to conform to the inside of the C-shaped bend. The back-up punch 23 advances to the position shown in FIG. 6 which is the position at which the material 14 is finally disposed for forming.

The forming member 25 has a lower upwardly and laterally inclined surface which inclines toward the strip and surface 31 which engages and slides over the end of the material 14, and forces it to conform strictly to the contour of the end 30.

It will be noted that the bottom surface 34 of the back-up punch 23 is slightly above the top surface of the strip 16 so that it can slide over top of the strip 16.

Figure 7:
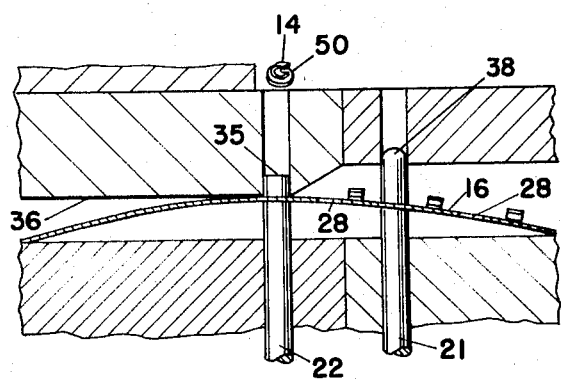
FIG. 7 is a cross sectional view of the pilot device taken on line 7—7 of FIG. 1 locating the ribbon to positively blank out the disk with the ribbon welded thereto.

The punching station 13 is shown in FIG. 7. Here, the locating pin 21 is driven upward into the proper pilot holes 28 in synchronism with the movement of the punch 22 to insure that the end member of material 14 will be properly positioned above punch 22. The locating pin 21 also moves upward in synchronism with the movement of the punch 22 and, therefore, the rounded upper end 38 of locating pin 21 enters one of the proper pilot holes 28 to positively locate the end of material 14 which has now been formed into a C-shaped relative to the flat top surface 35 of the punch 22. The punch 22 then moves upward and brings the upper side of the strip 16 into engagement with the lower shearing surface 36 of the die which blanks out the disk 50 having the C-shaped material 14 welded to its center.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A mcahine for attaching small pieces of strip to small disks comprising
   a welding station adapted to direct a strip of material from which said disks are to be formed therethrough,
   means to direct a supply of said ribbon to said strip,
   welding means to weld an end of said ribbon to said strip,
   reference means for providing a reference indicia on said strip,
   means to sever the welded end of said ribbon from said supply,
   a punching station,
   blanking means at said punching station for blanking out said disks of said material from said strip having said end welded thereto,
   and means at said punching station cooperating with said reference indicia on said strip for positively locating said ribbon relative to said punching staton whereby said disks are punched out with said material welded thereto at a predetermined position thereon.

2. The machine recited in claim 1 wherein
   said reference means comprises a punch thereon synchronized with said welding means,
   said punch being adapted to punch a hole comprising said indicia means in said strip.

3. The machine recited in claim 2 wherein
   a forming station for shaping said end of said ribbon to a predetermined shape is disposed on said machine adjacent said welding means.

4. The machine recited in claim 3 wherein
   said forming station comprises a back-up punch and a first forming punch,
   said back-up punch being adapted to move over a portion of said piece of material and having an end thereon shaped to form an intaglio of a bend adapted to be made in said end,
   said deflecting member being adapted to move over said ribbon and to urge the free end of said piece of material upward,
   said bcak-up punch having means thereon to engage an end of said piece of material above said back-up punch to deflect said end over the top surface of said forming punch.

5. The machine recited in claim 4 wherein
   said ribbon is recessed into a part of said machine,
   and the bottom of said forming punches slide along the top surface of said machine and over the top of said ribbon and said piece of material.

6. A machine for attaching small pieces of strip to small disks comprising
   means to weld said pieces of material to said ribbon,
   means to form said pieces of material to a predetermined shape after they are welded thereto,
   said forming means comprising a first punch adapted to move over top of said end of said material and said forming means having an end thereon which is an intaglio of one side of the final shape of said material,
   a second and a third punch,
   said second punch having a downwardly and inwardly inclined top surface thereon,
   said second punch being adapted to move over said ribbon between it and said end whereby said end is deflected upward,
   said third punch adapted to engage the end of said material above said first punch whereby said end is bent around the end of said first punch in conformance with the contour thereon.

7. The machine recited in claim 6 wherein
   said disks are part of a ribbon and means is provided to punch said disks from said ribbon.

References Cited by the Examiner
UNITED STATES PATENTS

| | | | |
|---|---|---|---|
| 2,845,693 | 8/1958 | Shetterly | 29—411 |
| 3,080,640 | 3/1963 | Jochems | 29—411 |
| 3,191,273 | 6/1965 | Gwyn | 29—155.55 |
| 3,191,274 | 6/1965 | Gwyn | 29—155.55 |

RICHARD H. EANES, JR., *Primary Examiner.*